May 13, 1969  R. A. GUDMUNDSEN ET AL  3,444,478
BLEACHABLE REFLECTANCE OUTPUT COUPLER
Filed May 12, 1966                                  Sheet 1 of 3

INVENTORS
RICHARD A. GUDMUNDSEN
EARL L. STEELE
BY
L. Lee Humphries
ATTORNEY

INVENTORS
RICHARD A. GUDMUNDSEN
EARL L. STEELE
BY
ATTORNEY

INVENTORS
RICHARD A. GUDMUNDSEN
EARL L. STEELE
BY
ATTORNEY

United States Patent Office 3,444,478
Patented May 13, 1969

3,444,478
BLEACHABLE REFLECTANCE OUTPUT COUPLER
Richard Austin Gudmundsen, Santa Ana, and Earl L. Steele, Newport Beach, Calif., assignors to North American Rockwell Corporation, a corporation of Delaware
Filed May 12, 1966, Ser. No. 549,639
Int. Cl. H01s 3/02
U.S. Cl. 331—94.5   10 Claims The present invention is directed to lasers and more particularly to an output coupler for lasers operating in the pulsed transmission mode.

The application of lasers to many industrial and research areas requires greater peak pulse power or higher efficiencies than are presently available. An increased pulse power laser system would permit tracking over greater distances with greater accuracy, make possible imaging systems, and allow the generation of optical harmonics with greater efficiency, while increased efficiency would decrease power requirements for portable laser applications. Many methods of Q-switching have been proposed or used in laser systems. The operation of a Q-switched laser involves two distinct steps. The laser cavity is first held at a very low regeneration value by spoiling one or both reflecting surfaces while the amplifying medium is pumped to some high value of inversion. Next the spoiled reflector is returned to its desired reflecting value and some of the stored energy in the amplifying medium is transferred into an exponentially-growing laser beam. Since one of the cavity reflectors is usually partially transmitting to externally couple a portion of the beam, the intensity of the external beam will thus be at all times a fixed fraction of the internal beam.

Operation in the above described mode is generally referred to as the pulse reflectance mode since only the reflectance of the cavity is changed while the fractional transmission remains fixed. This mode of operation has the distinct disadvantage that a fraction of the energy is lost each time a reflection is made by the exit optic system. Thus, energy is externally coupled at useless power levels and because of this loss the rate of buildup of beam intensity is lessened with a subsequent time broadening of the peak power pulse. These factors in turn reduce the absolute peak power and the resulting overall efficiency is very low. Systems operating in this mode generally produce output beams of only about two percent of the stored energy in the upper laser states prior to high cavity generation where a three level system is utilized.

In order to eliminate any external coupling until the beam intensity inside the cavity has reached a maximum, the pulsed transmission mode is utilized in which a sudden total coupling is possible to extract maximum energy from the cavity. In this mode of operation minimum regeneration is maintained during pumping as in the pulsed reflectance mode. However, in the pulsed transmission mode the cavity is switched to maximum regeneration, 100 percent reflection at both ends of the cavity, to achieve maximum radiation density in the cavity with minimum external coupling. When the radiation density is maximum one of the cavity reflectors is rapidly switched to a condition of total transmission. In this manner the maximum amount of the laser beam is externally coupled.

The transmission mode, however, has uncompensated losses resulting from imperfect reflections and scattering and consequently the theoretically available energy, i.e., one-half of the energy stored in the upper states, is not actually available. In fact, an emptying figure of about 0.2 is a more realistic value in a practical system. It is therefore apparent that the primary disadvantage in the pulse transmission operating mode is the absence of an efficient method or means for rapidly switching one of the cavity reflectors to a totally transmitting state.

It is the primary object of the present invention to provide a means for rapidly switching one cavity reflector of a laser system to a totally reflecting state.

It is another object of the present invention to provide an optical switching means for changing the reflecting state of one cavity reflector of a laser system to a transmitting state.

It is another object of the present invention to provide an optical switching means for a laser operating in the pulsed transmission mode by which the Q of the laser cavity is held low during the pumping phase and is then suddenly raised to a very high value thereby causing maximum stimulated emission.

It is still another object of the present invention to provide an optical Q-switching system for a laser in which the highly reflective state of one reflector is suddenly changed to a condition of high transmissivity.

A further object of the present invention is to provide a laser output coupler in which a reflecting substance is utilized at one end of the cavity, the reflective characteristics of that substance being changed to total transmission because of the absorption of a small amount of radiation.

A still further object of the present invention is to provide a bleachable reflectance output coupler which reflects almost all impinging radiation but absorbs a small fraction which induces bleaching and reduces reflectance by modifying the index of refraction.

These and other objects of the present invention will be more apparent from the following detailed description of various embodiments of the present invention taken together with the drawings, hereby made a part thereof, in which.

Figure 1:
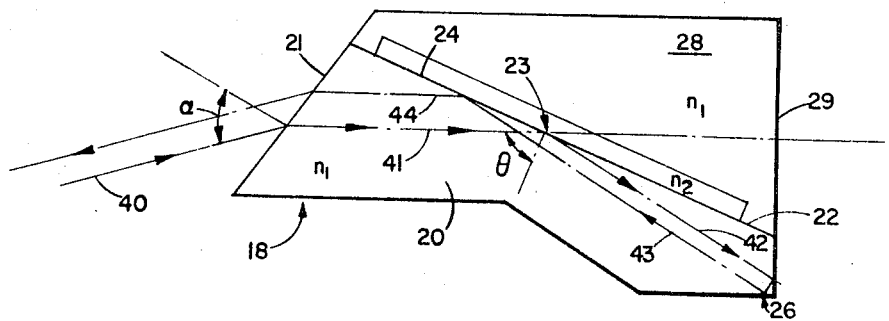
FIG. 1 shows a schematic view of the bleachable reflectance output coupler of the present invention.

Referring to the drawings in detail, FIG. 1 shows the arrangement of the device of the present invention. The device utilizes a saturable or bleachable agent which, in response to radiation absorbed, exhibits a change in reflecting characteristics. The agent is selected, as described in detail hereinafter, so that the peak absorption lies close to the laser wavelength. Specifically, the device of FIG. 1 indicated generally as 18, has a body portion 20 with a radiation input face 21 which is cut at the Brewster's angle α, to minimize reflection losses. On the output face 22 of the body 20 a total internal reflection component 23 is positioned having its face 24 in contact with face 22. The component 23 is a bleachable substance having a thickness of about a few wavelengths of light, an index of refraction which is less than the index of refraction of the body 20, and an incidence angle which is greater than the critical angle.

The body portion 20 has a rooftop prism portion 26 for returning radiation reflected by the component or substance 23 along the path of the incident radiation. The portion 26 may be replaced by an externally controlled rotating mirror reflector if desired. A second body portion 28 is optically coupled to internal reflection component 23 and has a radiation exit face 29. The second portion 28 may have an index of refraction different from or the same as that of body portion 20, as discussed hereinafter.

Figure 2:
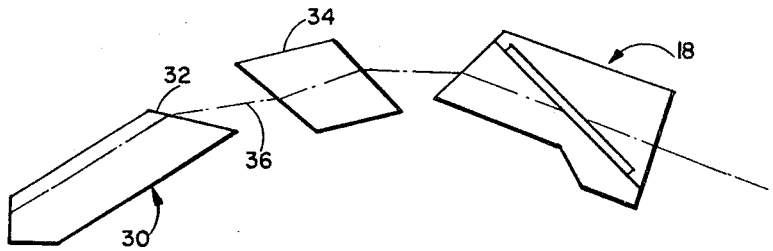
FIG. 2 shows the arrangement of the device of FIG. 1 in a laser system.

FIG. 2 illustrates schematically the arrangement of the device of FIG. 1 in a laser system which comprises an active laser rod 30 having a rooftop prism cut on one end an outlet face 32 cut at Brewster's angle, a standard saturable filter 34 having its outlet and inlet faces at Brewster's angle and the bleachable reflectance output coupler 18 shown in detail in FIG. 1. The optical axis 36 shows the general mode of radiation travel through the devices comprising the laser systems.

Operation of the laser system is as follows. The laser 30 is pumped, by methods and apparatus well-known in the art, to a high inversion density and is prevented from lasing by the operation of saturable filter 34. When filter 34 is saturated the laser cavity is highly regenerative as a result of the rooftop prism in the laser rod and in the bleachable reflectance coupler. When the internal laser beam intensity has increased sufficiently, the bleachable layer 23 in unit 18 saturates and the total internal reflection surface disappears. The beam is then externally coupled.

The beam path is shown in detail in FIG. 1. The incident beam 40 from the lasing crystal 30 is refracted by the Brewster's angle surface 21 and directed in a path normal to exit surface 29. Interposed along this path is a thin layer of a bleachable substance 23 which reflects the beam 41 along path 42 to rooftop prism portion 26 where the path is reversed. The returning beam 43 is again reflected by the layer 23 redirected along path 44 and refracted at surface 21 so that it is returned to the lasing crystal.

Figure 3:
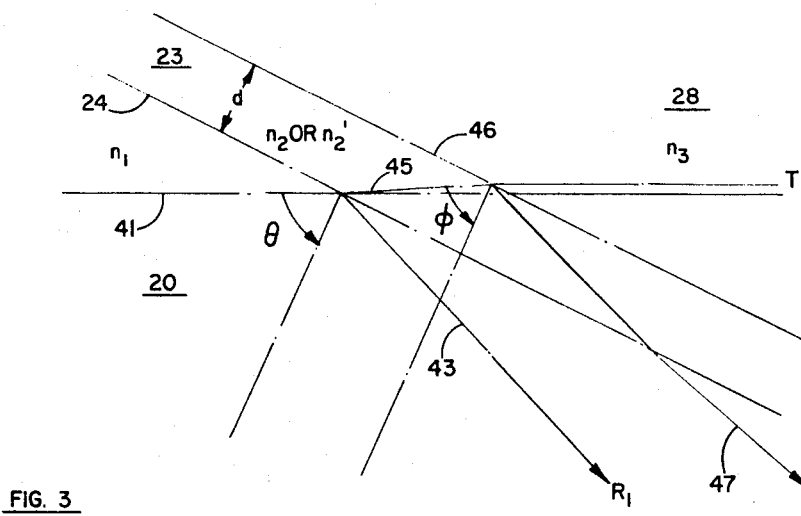
FIG. 3 is a schematic view of one embodiment showing reflective and refractive characteristics of the total internal reflection component of the device of FIG. 1.

Referring now to FIG. 3, a detailed diagram of beam geometry in the total internal reflection component of the device 18 is shown. The beam 41 is incident upon one surface 24 of the bleachable reflectance layer 23 of thickness $d$ and index of refraction $n_2$ or $n_2'$. The angle of incidence $\theta$ may be adjusted so that it is greater than the critical angle to achieve high reflectivity. The thickness $d$ must be sufficiently great so that losses by frustrated total reflection are avoided. Considering the layer 23 as non-absorbing, for given values of the indices of refraction $n_1$ and $n_2$ and $\theta$, the ratio of reflectivity, R, to the transmissivity, T, for light with polarization components parallel $(p)$ and perpendicular $(s)$ to the plane of incidence, can be determined from the equation $$\left(\frac{R}{T}\right)_p = \frac{(N_t^2-1)^2(N_t^2 \sin^2 \theta - \cos^2 \theta)^2}{4N_t^2 \cos^2 \theta (N_t^2 \sin^2 \theta - 1)}$$
$$\sinh^2\left[\frac{2\pi d}{\lambda}(N_t^2 \sin^2 \theta - 1)^{1/2}\right] \quad (1)$$

$$\left(\frac{R}{T}\right)_s = \frac{(N_t^2-1)^2}{4N_t^2 \cos^2 \theta (N_t^2 \sin^2 \theta - 1)}$$
$$\sinh^2\left[\frac{2\pi d}{\lambda}(N_t^2 \sin \theta^2 - 1)^{1/2}\right] \quad (2)$$

The reflectance is given by $$R = \frac{R/T}{1+(R/T)}$$

It is known that a variation of 0.04 in the index of refraction is readily achieved in the wing of an absorption band of selected substances. Thus, with an $n_1$ of 1.375 and an $n_2$ of 1.340, $N_t = 1.026$. Let $\theta = 77°$ and $\phi = 78°$, and assuming a value of $d/\lambda = 3$ the reflectivity of the $p$ component $Rp$ (Eq. 1) is equal to 0.99 while that for the S component (Eq. 2) is greater. Thus, essentially total reflection takes place at the surface.

If the layer 23 is considered to be absorbing the resulting effect is the same as increasing the thickness $d$, since the absorption will reduce the magnitude of the frustrated total reflection. Consequently, the reflectivity would be very near unity if the absorption did not influence the reflectivity. Thus, the effects of frustrated total reflection may be ignored and the reduction in reflectivity attributed to the presence of the absorbing medium.

Figure 4:
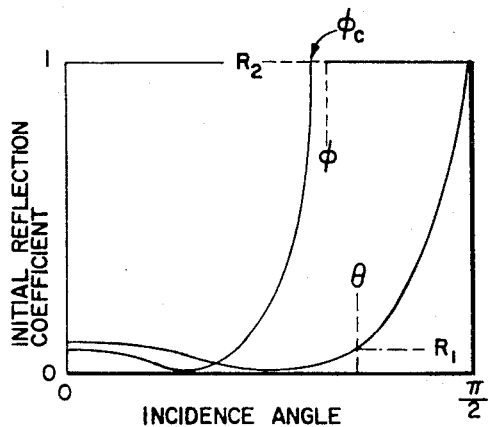
FIG. 4 is a graph showing the relative magnitudes of the partly reflected and totally reflected beams of FIG. 3.

Referring specifically to FIG. 3, the three regions 20, 23 and 28 having refractive indices, $n_1$, $n_2$ (or $n_2'$) and $n_3$, it is apparent that radiation impinging on surface 24 along beam path 41 will be partly reflected as at 43 while that portion of the beam refracted along path 45 will be totally reflected at surface 46 along path 47. The relative magnitudes of these two reflections as a function of incident angle $\theta$ is shown in FIG. 4. The graph in FIG. 4 shows the initial reflection coefficient as a function of incident angle for the case $n_1 > n_2 > n_3$ where $n_3/n_2 = \sin \phi_c$. The value of the angle $\theta$ is chosen so that the angle $\phi$ is slightly larger than the critical angle $\phi_c$. The region 23 (see FIG. 3) is a material which has a bleachable absorption center.

Figure 5:
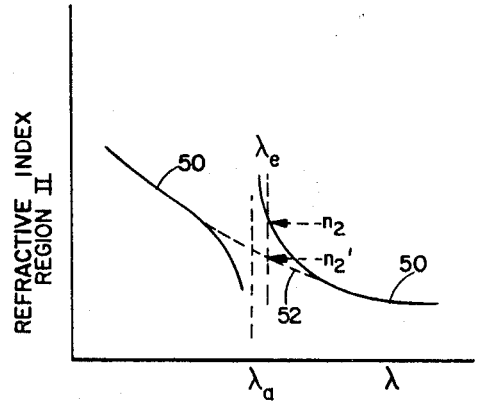
FIG. 5 is a graph showing the variation in refractive index of the total internal reflection cmponent.
Figure 6:
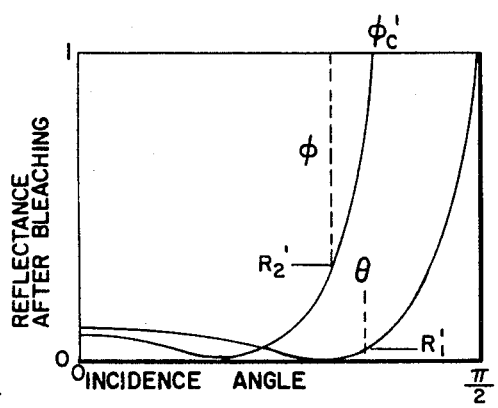
FIG. 6 is a graph of the effect of radiation absorption on the bleachable substance.

The graph of FIG. 5 shows the variation in the refractive index of the material of region 23 as a function of wavelength, where $\lambda_a$ is the absorption resonance wavelength and $\lambda_e$ is the laser wavelength. Before bleaching, the refractive index of region 23 is $n_2$, as shown by discontinuous solid curve 50. As more and more of the ground states of the bleachable material in region 23 are raised to a long lived upper state, the absorption disappears and the index of refraction drops to $n_2'$, shown as doted line 52. The graph of FIG. 6 illustartes the effect this reduction in the value of $n_2$ to $n_2'$ has, where $n_1 > n_2' > n_3$ and $n_3/n_2' = \sin \phi_c'$. The final critical angle $\phi_c'$ will be larger than the initial critical angle $\phi_c$. If $\phi_c'$ is greatre than $\theta$, then the reflection $R_2$ (see FIG. 3) will be reduced to $R_2'$ (see FIG. 6) and the transmission $(1-R_2)$ will increase from zero to approximately $(1-R_2')$, since R is too small to appreciably effect the results.

Thus, by utilizing a material in region 23 which upon exposure to the laser radiation exhibits a change in the index of refraction, and by maintaining the incident angle constant the initial reflection coefficient $R_2 = 1$ at $\theta$ is reduced to the point where the reflection coefficient after bleaching, $R_2'$, is equal to a small fraction of the initial value $R_2$. In this case the thickness of region 23 is the order of a few wavelengths.

Figure 7:
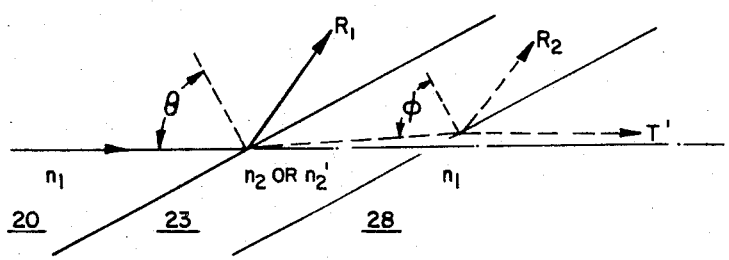
FIG. 7 is a schematic view of another embodiment showing the reflective and refractive characteristics of the total internal reflection component of the device of FIG. 1.
Figure 8:
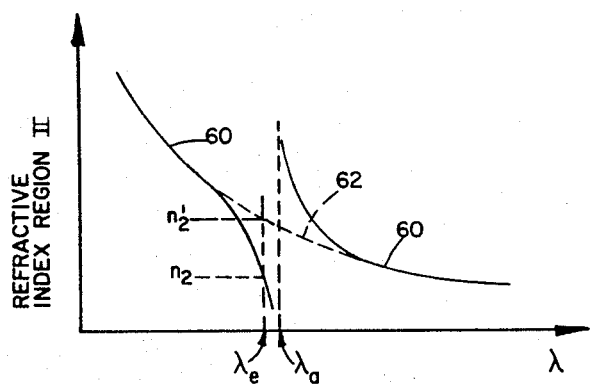
FIG. 8 is a graph showing the variation in refractive index for the embodiment of FIG. 7.

The above described operation of the bleachable reflectance layer 23 assumes that $\lambda_a < \lambda_e$. However, the case, where $\lambda_a > \lambda_e$, is also operable and is described with respect to FIGS. 8 and 9. Referring to FIG. 7, the bleachable material 23 is, in this embodiment, sandwiched between two regions, 20 and 28 of identical index of refraction $n_1$, and has a refractive index $n_2$ which is less than $n_1$. In this case, see FIG. 8, the absorption responsible for the change in refractive index is at a longer wavelength, $\lambda_a$, than the laser wavelength, $\lambda_e$. Before the bleaching or absorption action, the refractive index of region 23 is $n_2$ as shown by discontinuous curve 60. In the unbleached condition $R_1$ is essentially unity. As the radiation is absorbed by the material 23, this absorption disappears and the refractive index increases to $n_2'$ shown as the dotted curve 62.

Figure 9:
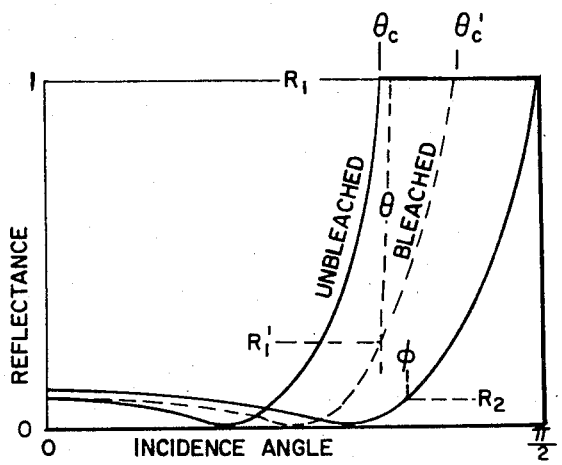
FIG. 9 is a graph of the effect of radiation absorbed on the bleachable substance for the embodiment of FIG. 7.

The graph in FIG. 9 illustrates the effect this increase in value of $n_2$ to $n_2'$ has where $n_1 > n_2' > n_2$. In the total internal reflection phenomenon this is a penetration of the electric field in the region 23. Thus, $R_1$ will not quite be total in that region and region 23 will start to bleach out. As this happens $n_2$ will increase from $n_2$ to $n_2'$, $\theta_c$ changes to $\theta_c'$, and $R_1$ shifts to $R_1'$. T' then shifts from zero to essentially $(1-R_1')$. Thus, as is apparent from FIG. 9 the reflectance is reduced to a small fraction of $R_1$ by the shift from an unbleached condition to a bleached condition and the transmission, T, through the layer is suddenly increased.

In both the above described cases the Q-switch absorber is either located in the cavity such as element 34, FIG. 2, or else an external conventional rotating mirror, prism or similar device is used to induce the original light flux pulse in the system. This light pulse in turn then does the bleaching and switching of the output coupler as herein described.

Materials which may be utilized as the bleachable component in the output coupler of the present invention should have the following characteristics: (1) the substance must have a resonance close to but either on the short or on the long wavelength side of the laser radiation; (2) the energy required to bleach the substance or shift from a state of reflection to one of transmission must be small in order to avoid the introduction of large energy absorption and consequent inefficient operation; (3) the substance must be selected so that the energy absorption required for the shift in optical characteristics does not result in the dissociation of the substance (the index change resulting from the absorption should be at least about two percent); (4) the lifetime of the upper state must be greater than the length of the pulse to allow maximum laser light to be transmitted.

Examples of substances which exhibit these characteristics are Kryptocyanine, Vanadium Phthalocyanine and Neocyanines when the laser crystal is ruby and Polymethines when the laser material is doped with Neodymium. Other substances having the specified characteristics may be selected by those skilled in the art. The solvents utilized in preparing the substances should have an index of refraction as close to that of the material, e.g., silica, utilized in the body portions 20 and 28 of the device so that refractive losses are minimized.

The present invention is not limited to the specific details of the particular embodiments described, since many modifications will be apparent to those skilled in the art, the scope of the present invention being limited only by the appended claims.

We claim:

1. An output coupler for a pulsed laser beam comprising means for reflecting radiation pulses received from a pulsed laser, said means including a bleachable reflectance means which is highly reflective for a preselected time and which is changed to a condition of high transmissivity after a preselected exposure to radiation, and means optically coupled to said bleachable reflectance means for transmitting radiation pulses passed by said bleachable means.

2. The output coupler of claim 1 wherein said bleachable reflectance means is a layer of material having a resonance on the long wavelength side of said laser radiation and a transmissivity lifetime greater than the duration of said radiation pulse.

3. The output coupler of claim 1 wherein said bleachable reflectance means is a layer of material having a resonance on the short wavelength side of said laser radiation and a transmissivity lifetime greater than the duration of each radiation pulse.

4. An output coupler for a laser beam comprising a plurality of light directing surfaces positioned with respect to a beam pulse from a laser source incident on one of said surfaces so as to direct said incident beam along a first path back to said source, said incident surface being located at a predetermined angle with respect to said beam to direct said beam along a said first path to a second surface, said second surface containing a substance which initially reflects said light and which has optical characteristics which change so that said light is transmitted through said second surface after exposure to light of a preselected wavelength and intensity, said second surface initially reflecting said light along said first path and upon change in characteristic passing said light along a second path in a direction away from said source.

5. An output coupler for a laser beam comprising a first light transmitting body, said body having a surface upon which a laser beam pulse is incident positioned at a preselected angle to said beam and a second surface at a preselected angle to said first surface, said second surface having a substance in contact therewith which initially has light reflecting properties but which after exposure to light of a predetermined wavelength and intensity changes to light transmitting properties, means on said body for directing light initially reflected by said second surface back through said incident surface, and means adjacent said second surface for transmitting light passed by said second surface in a direction away from said incident surface.

6. An output coupler for a laser beam comprising a first light transmitting body having a preselected index of refraction, said first body having a surface through which an incident light beam pulse is directed to a second surface, said first and second surfaces being positioned at preselected angles to said incident beam and each other, said second surface having a substance thereon which initially has light reflecting properties and which after exposure to a predetermined wavelength and intensity has light transmitting properties, means on said first body for directing light reflected by said substance on second surface in a direction back along said incident beam, a second body having a surface optically coupled to said substance for receiving light passed by said substance after said change of properties, said second body transmitting said passed light in a direction away from said incident beam, said second body having a preselected index of refraction.

7. The output coupler of claim 6 in which said first and second light transmitting bodies have the same index of refraction.

8. The output coupler of claim 6 wherein said substance has a resonance on the long wavelength side of said incident light.

9. The output coupler of claim 6 wherein said substance has a resonance on the short wavelength side of said incident light.

10. The output coupler of claim 6 wherein said substance is selected from the class consisting of kryptocyanine, vanadium phthalocyanine, neocyanines and polymethines.

References Cited

UNITED STATES PATENTS

| 3,289,099 | 11/1966 | Masters. |
| 3,307,897 | 3/1967 | Lohmann. |

FOREIGN PATENTS

| 289,372 | 3/1965 | Netherlands. |
| 1,026,596 | 4/1966 | Great Britain. |

OTHER REFERENCES

Kafalas et al., "Photosensitive Liquid Used as a Nondestructive Q-Switch in a Ruby Laser," Journal of Applied Physics, vol. 35, pp. 2349–50, August 1964.

Soffer, "Giant Pulse Laser Operation by a Passive, Reversibly Bleachable Absorber," Journal of Applied Physics, vol 35, p. 2551, August 1964.

Sorokin et al., "Ruby Laser Q-Switching Elements Using Phthalocyanine Molecules in Solution," IBM Journal of Research and Development, vol 8, pp. 182–84, April 1964.

Steele et al., "A Laser Output Coupler Using Frustrated Total Internal Reflection," Applied Optics, vol. 5, pp. 5–8, January 1966.

RONALD L. WILBERT, Primary Examiner.

E. BAUER, Assistant Examiner.

U.S. Cl. X.R.

350—160, 285, 286